April 3, 1934.  R. B. METZNER  1,953,815
BRAKE DRUM
Filed Feb. 25, 1932
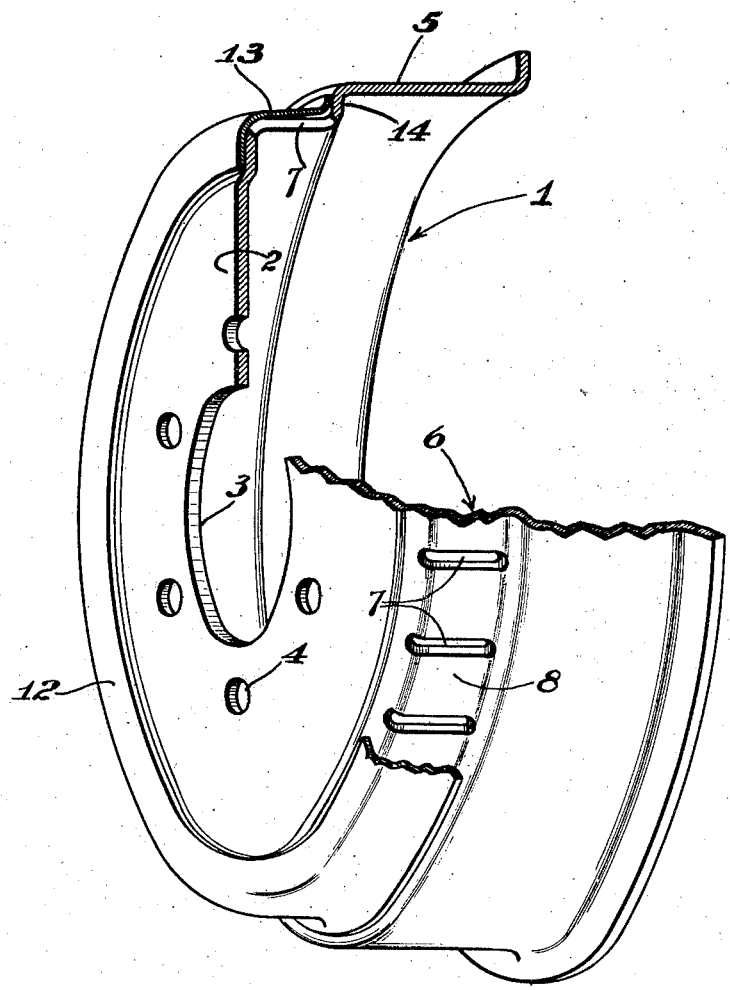
WITNESSES
A.B.Wallace.
V. A. Peckham
INVENTOR
Robert B. Metzner
by his attorneys
Brown, Critchlow and Flick Patented Apr. 3, 1934

1,953,815

UNITED STATES PATENT OFFICE 1,953,815

BRAKE DRUM

Robert B. Metzner, Wheeling, W. Va.

Application February 25, 1932, Serial No. 595,075

1 Claim. (Cl. 188—218)

The invention relates to brake drums, and more particularly to means for preventing permanent distortion of their braking flanges due to heat expansion thereof.

The type of brake drum commonly used on motor vehicles and the like comprises an anchor plate, usually of circular form, encircling an axle and attached to the inside of a wheel, a hub plate or the like, the plate being provided with an integral peripheral flange extending at right angles therefrom. The brake shoes of the braking mechanism are disposed in or upon the drum where they frictionally engage the surface of the braking flange when applied. When the brake shoes are forced against a rapidly revolving braking flange, it is heated by the friction thus produced and caused to thermally expand radially of the drum. However, as the anchor plate, which does not come into contact with the brake shoes, is relatively cool and, therefore, does not expand so rapidly nor as much as the braking flange, the flange is restrained from expanding evenly throughout its width. In other words, the outer portion of the cylindrical flange expands freely, but the inner plate-engaging portion is restrained from expanding by the substantially unexpanding plate. Consequently, the flange bulges and bells outward, becoming distorted from its cylindrical form. Under conditions of sudden application of the brake when the wheel is revolving rapidly, or of prolonged application, the heat frictionally generated is so great that it distorts the flange beyond its elastic limit, thereby producing permanent distortion which thereafter prevents uniform application of brake pressure upon the shoes.

It is among the objects of this invention to provide a brake drum in which substantially unrestrained thermal expansion of its braking flange throughout the width thereof is permitted, permanent distortion of the flange is obviated, and the proper functioning of which is not impaired by such thermal expansion. Other objects and advantages will appear hereinafter.

In the accompanying drawing, the figure is a perspective view of a brake drum illustrating the preferred embodiment of the invention, the drum being broken away in part to better show its construction.

In acordance with this invention, the anchor plate and the cylindrical braking flange of a brake drum are connected together by an intermediate mechanically expansible annular portion. When the braking flange expands under the heat produced by brake shoes frictionally engaging its surface, the area of the flange nearest the anchor plate is not restrained, to any appreciable degree, from expanding with the remainder of the flange, because the intermediate annular portion, being adapted to mechanical expansion, bells radially outward with the expanding flange.

Referring to the drawing, a brake drum 1 is shown as an integral structure having a circular plate 2 provided with an opening 3 permitting the plate to encircle a vehicle axle or like shaft, and being adapted to attachment to the inside of a hub plate or the like by bolts passing through apertures 4. Disposed at right angles to plate 2 is a cylindrical flange 5, the surface of which is adapted to be frictionally engaged by suitable brake shoes, not shown. The drum may be made of cast, pressed or otherwise formed metal, and the shoe-engaging surfaces of its flange may be provided with a coating of cast iron or of other metals or materials, as is well understood in this art.

In accordance with this invention, the peripheral edge of plate 2 and the inner edge of braking flange 5 are spaced apart by an intermediate annular portion 6 which connects the two. This intermediate portion is mechanically expansible to prevent it from substantially restraining expansion of the inner edge of the flange when the flange is heated by the friction of the brake shoes against it. Intermediate portion 6 is preferably formed integral with the remainder of the drum, and, as shown in the drawing, may be rendered expansible by forming parallel slots 7 through it at spaced intervals, whereby it is divided into a plurality of fingers 8. When flange 5 becomes heated and expands, its inner edge, instead of being restrained by plate 2, carries the adjoining ends of fingers 8 radially outward with it. Distortion of the braking flange beyond the elastic limit of the metal, which occurs when it is joined directly to the substantially unexpanding rigid plate 2, is thereby avoided.

The brake shoe mechanism seals the open side of the drum, but it is apparent that if slots 7 remain open, foreign matter would be likely to enter the brake drum through the slots and impair the proper functioning of the brake. To prevent this, there is provided a cover ring formed of sheet metal or other suitable material, comprising an inturned flange 12 engaging the outer face of plate 2, and a cylindrical flange 13 overlying the intermediate annular portion 6 which has a smaller diameter than the braking flange in order to form therebetween an annular shoulder 14 against which the free edge of ring flange 13 abuts to produce a seal. It is to be noted that the free edge of flange 13 bells outward to prevent it from interfering with the expansion of annular portion 6 when the expanding braking flange draws the fingers radially outward. As it is desirable that the anchoring surface of the drum structure be flat throughout its area, and not present a circumferential raised portion, all that portion of plate 2 which is encircled by the inner edge of flange 12 is pressed outward, as shown in the drawing, to bring its outer surface into the same plane as that of flange 12. When the brake drum is attached in place, the cover ring may be held in place against plate 2 by the member to which the drum is secured, or it may be attached to the drum.

There is thus provided a brake drum having a shoe-engaging flange which has the substantial and important advantage of retaining its shape, thereby insuring that it will function properly under all conditions.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

A brake drum comprising an anchor plate, a cylindrical braking flange disposed at right angles thereto, a plurality of spaced fingers connecting said flange to said plate, and means for sealing the spaces between said fingers against the entrance of foreign matter into the drum.

ROBERT B. METZNER.